No. 634,954. Patented Oct. 17, 1899.
T. McKINNON & J. PRINGLE.
WHEEL TIRE.
(Application filed Apr. 19, 1898.)
(No Model.)
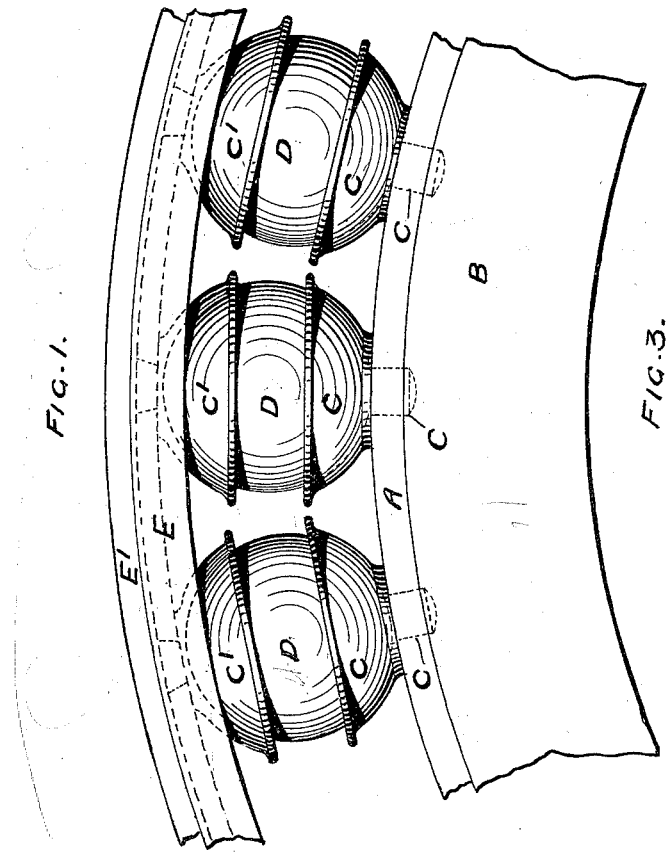
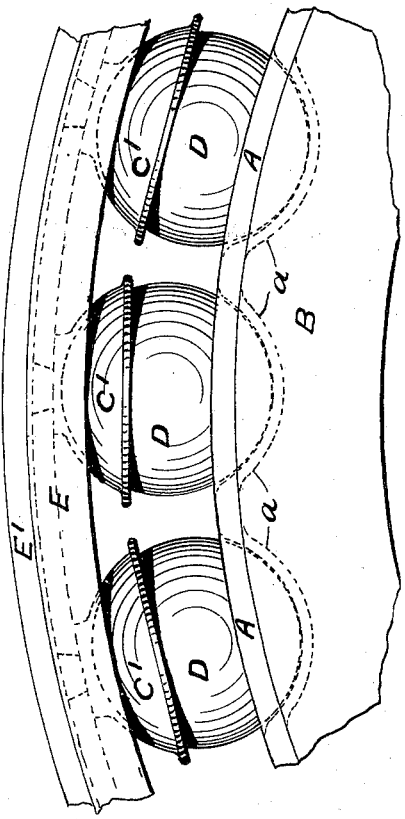
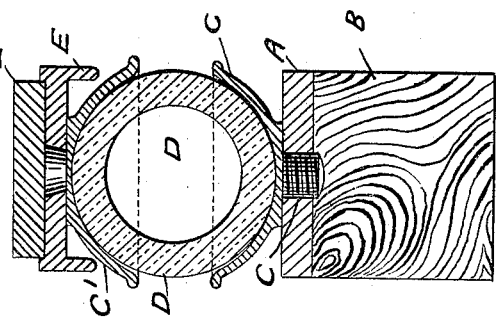
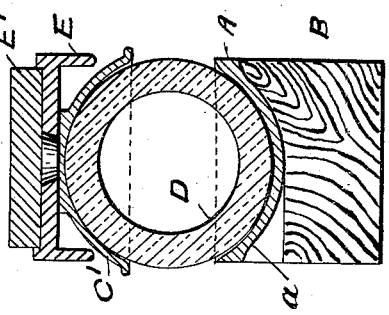
Witnesses:
C. Holloway
William Rigby
Inventors
Thomas McKinnon,
James Pringle,
By J. M. Bowen
Attorney.

UNITED STATES PATENT OFFICE.

THOMAS McKINNON AND JAMES PRINGLE, OF GLASGOW, SCOTLAND; SAID PRINGLE ASSIGNOR TO SAID McKINNON.

WHEEL-TIRE.

SPECIFICATION forming part of Letters Patent No. 634,954, dated October 17, 1899.

Application filed April 19, 1898. Serial No. 678,139. (No model.)

*To all whom it may concern:*

Be it known that we, THOMAS MCKINNON, chemical and produce broker, of 2 Oswald street, and JAMES PRINGLE, practical engineer, of 124 Stanley street, Kinning Park, Glasgow, Scotland, have invented new and useful Improvements in Wheel-Tires, (for which application for patent in Great Britain, No. 21,615, dated September 21, 1897, has been made,) of which the following is a specification.

This invention has for its object to provide a wheel-tire suitable alike for light wheels, such as those fitted in cycles, and for the heavier class of wheels used for carriages or other road-vehicles, the said tire being of the pneumatic or resilient type, but not being subject to the risks involved by puncture of the usual pneumatic tire. The resilient or cushioning effect is obtained by interposing between the felly or rim of the wheel and the treading-surface a series of hollow rubber balls held in place by means of small hemispherical cavities or cups secured to the outer tread-ring, the arrangement being such that the load on the wheel is distributed over a number of the air-balls.

In the accompanying drawings, Figure 1 is an elevation of part of the composite tire and felly of a wheel as constructed in accordance with our invention, and Fig. 2 is a cross-section thereof. Figs. 3 and 4 are similar views showing a slightly-modified construction.

As represented at Figs. 1 and 2, a metallic or other strap or rim A is secured around the ordinary wooden or other felly B, and on this strap are fitted a series of small hemispherical cups C, each by preference adjustably secured in the strap or rim by means of a screw-threaded stem c. Into these cups hollow rubber balls D, filled with air, are fitted and are tightly held therein by means of inverted hemispherical cups C', secured by rivets or otherwise to the inner face of a metallic ring E, preferably flanged, on which is fitted a treading-surface E', of iron or of rubber, wood, or other material. By means of the screw-threaded stems the cups C and C' may be brought more or less closely together to press on the balls, and thus the felly and outer rim or tread of the wheel are firmly held together and the degree of resilience regulated, while lateral play of the tread is avoided.

It will be seen that in the present construction each ball is held in a hemispherical cavity or cup on its inner side and in a hemispherical cavity or cup on its outer side, the two cavities or cups embracing and holding the ball firmly all around, excepting a small central portion which is necessary to allow for the yielding of the balls under the weight of the vehicle. The ball being thus embraced and lateral expansion prevented, inflation of the ball is unnecessary. Each ball also forms an elastic connection between the inner rim of the spokes and the outer tread-ring, so that while the latter yields under pressure with the balls it cannot creep or move circumferentially around the balls. Great strength is imparted to the wheel owing to the balls being caught spherically on both sides, and the weight on the wheel is distributed over a large portion of the circumference.

In the modification represented at Figs. 3 and 4 the separate inner cups C are dispensed with and in lieu thereof the strap A is formed with a series of cavities $a$, whereinto the balls D are fitted.

In the lighter class of wheels, such as those used in cycles, the usual metallic rim may replace the wooden felly B shown and may be formed or fitted with cavities for the balls, while the outer tread E is also lightened.

Having now described the invention, what we claim, and desire to secure by Letters Patent, is—

1. In a wheel-tire, the combination with the felly or rim provided with a series of hemispherical cavities or cups and an outer tread-ring provided with a corresponding series of cavities or cups, of a series of hollow rubber balls arranged within and between said hemispherical cavities or cups, substantially as set forth.

2. In a wheel-tire, the combination with the felly or rim and a flanged outer tread-ring, the said felly or rim and the tread-ring each provided with a series of hemispherical cavities or cups, of a series of hollow rubber balls arranged within and between said hemispherical cavities or cups, substantially as set forth.

3. In a wheel-tire, the combination with the felly or rim and an outer tread-ring, of a series of cups attached to the felly or rim, a corresponding series of inverted cups attached to the tread-ring, and hollow rubber balls arranged within and between the two series of cups, one series of said cups provided with means whereby they may by adjustment be brought more or less closely to the other series of cups, substantially as set forth.

4. In a wheel-tire, the combination with the felly or rim and an outer tread-ring, of a series of cups attached to the outer tread-ring, a second series of cups provided with screw-threaded stems whereby they are attached adjustably to the felly or rim, and hollow rubber balls arranged within and between the two series of cups, substantially as set forth.

In witness whereof we have hereunto set our hands in presence of two witnesses.

THOMAS McKINNON.
    JAMES PRINGLE.

Witnesses:
 WALLACE FAIRWEATHER,
 JNO. ARMSTRONG, Junr.